Figure 1:
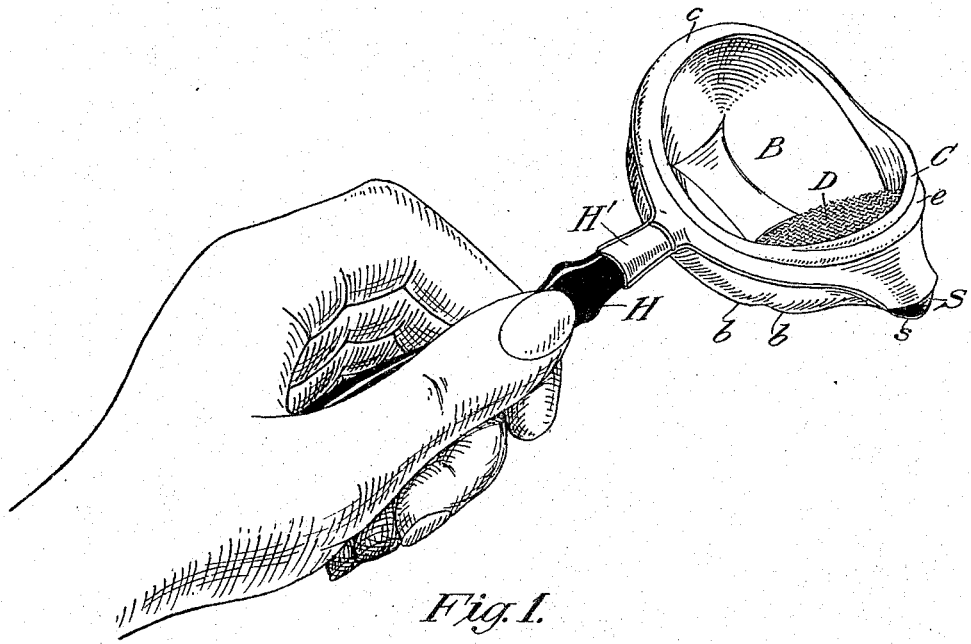

H. E. NOCK.
DRIPLESS STRAINER.
APPLICATION FILED SEPT. 9, 1915.

1,226,691.

Patented May 22, 1917.

INVENTOR
Harold E. Nock
BY
Arthur H. Armington
ATTORNEY

UNITED STATES PATENT OFFICE.

HAROLD E. NOCK, OF NORTH ATTLEBORO, MASSACHUSETTS, ASSIGNOR TO PAYE & BAKER MANUFACTURING COMPANY, OF NORTH ATTLEBORO, MASSACHUSETTS, A CORPORATION OF MASSACHUSETTS.

DRIPLESS STRAINER.

1,226,691.   Specification of Letters Patent.   Patented May 22, 1917.

Application filed September 9, 1915. Serial No. 49,790.

*To all whom it may concern:*

Be it known that I, HAROLD E. NOCK, a citizen of the United States, residing at North Attleboro, in the county of Bristol, State of Massachusetts, have invented certain new and useful Improvements in Dripless Strainers, of which the following is a specification.

My invention is an improved tea- and coffee-strainer for domestic use. The object of my improvement is to provide a dripless strainer of ornamental design and simple construction, easy and convenient to manipulate and adapt to prevent the contents from dripping when it is set down on the table at intervals in its use. A further object of my improvement is to provide for convenient removal of the screen from the strainer for cleansing, and for easy replacement thereof.

The invention is fully described in the following specification, illustrated by the accompanying drawings, in which like reference characters designate like parts.

In the drawings:—

Figure 2:
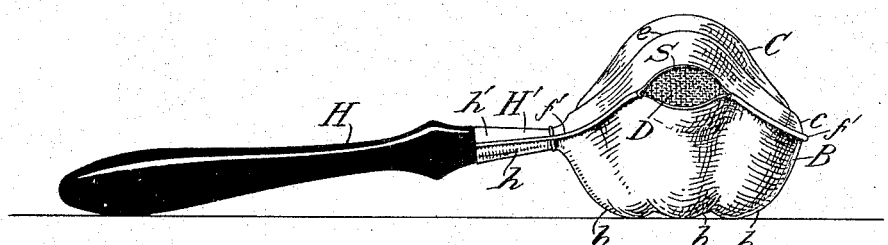
Figure 3:
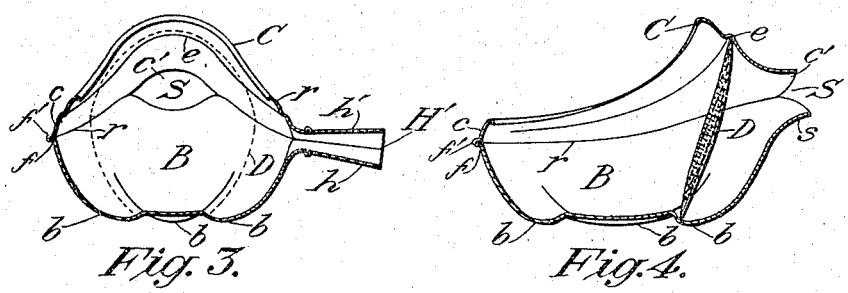
Figure 4:
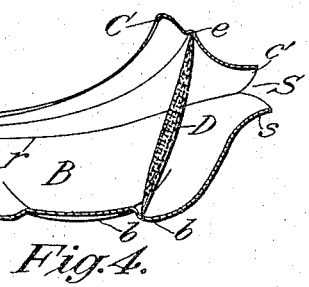

Figure 1 is a perspective view of my improved strainer illustrating the manner of holding it in use;

Fig. 2, an elevation of the same showing the strainer set down on the table to prevent it from dripping;

Fig. 3, a cross-sectional view looking toward the spout end of the strainer and illustrating the construction of the device; and Fig. 4, a longitudinal, sectional view of the strainer showing the method of holding the screen in place.

Referring to Figs. 1 and 2, my improved strainer comprises essentially a shallow, bowl-like vessel B having a hooded guard or cowl C partly covering its top, with a nose or spout S at one end, and a handle H extending laterally from its side. Positioned within the strainer, in front of the spout S and underneath the guard C, is a section of wire screen-cloth D through which the tea, coffee or other liquid is strained by pouring it into the bowl B while the strainer is held in the hand as illustrated in Fig. 1.

To render the device ornamental in design and simple and economical to manufacture, it is preferably constructed as follows: The complete strainer, with the exception of the handle, is constructed in dies by striking up the parts from relatively thin sheet-metal in the form shown in Figs. 3 and 4. The bowl B has a substantially ovate conformation, with its bottom swelled out in four lobe-like protuberances $b$ which serve as feet on which the strainer sets when not in use. At its narrower end the rim of the bowl B flares outwardly in the overhanging lip $s$ which forms the lower portion of the spout S. From the rear end of the bowl the rim $r$ sweeps upwardly in a graceful curve to the lip $s$ at which point it curves downwardly again to form the conventional "line of beauty" generally found in objects of art. The rim $r$ of the bowl B is also bent outwardly to form an overhanging flange $f$ entirely surrounding the bowl except at the opening of the spout as shown in Figs. 3 and 4. The flange $f$ serves as a means for attaching the cowl or guard C to the bowl B as next described.

The guard C conforms to the general outline of the bowl B and has a relatively narrow, curved rim $c$ overhanging the interior of the bowl at its rear end, while its forward end flares upwardly and rearwardly to cover the spout and inclose a portion of the interior. The lower edge of the guard C is flanged outwardly and then rolled inwardly at $f'$ to clench it around the flange $f$ on the rim of the bowl B, while leaving an opening at the spout S as before described. The opening $c'$ in the spout portion of the guard C has its lip curved upwardly to match the underlip of the spout, and the top of the spout rounds back to a shoulder $e$ formed by an abrupt bend in the metal. From the shoulder $e$ the guard flares rearwardly in a reverse curve with its edge rolled inwardly on itself to merge into the similarly formed, overhanging edge of its rear portion $c$.

Projecting from one side of the bowl B is a semicylindrically formed ear $h$ joined to a similarly shaped projection $h'$ on the guard C, see Fig. 3. The overlying edges of the two ears $h$, $h'$ are crimped together in the same manner as the adjacent edges of the bowl B and guard C so as to form a tubular shell or stem H′ adapted to receive the end of the handle H. Preferably, the stem H′ is tapered to adapt the end of the handle to be forced into it with a snug fit. The handle H is of conventional form constructed of wood, bone or other heat-resisting material, and may be either cemented in place or secured by indenting the stem into its sides. Preferably, the stem H' is inclined downwardly from the side of the bowl B so that when the strainer sets on its bottom the end of the handle H will rest on the table or other support to steady it, as shown in Fig. 2. Usually the strainer-bowl, guard and stem are ornamented with embossed designs, figures in relief, or, if desired, may be suitably etched or engraved to further embellish the article.

Inserted in the spout end of the strainer is is the screen D which is preferably arranged to be easily detached for cleaning. To provide for convenient removal of the screen for this purpose I have devised a novel method of holding it in place in the bowl through frictional contact with the sides thereof. The screen D is cut from the usual wire mesh in the form shown by the dotted lines in Fig. 3, and is made slightly larger in circumference than the inside of the strainer. By bending it slightly to a concavo-convex shape it may be sprung into position with its edges abutting the sides of the bowl B and the guard C to frictionally engage the walls of the strainer. The top edge of the screen seats within the shoulder e on the under side of the guard C, while its lower edge rests in the hollow of the front lobe-portion b of the bowl B as illustrated in Fig. 4. In this manner the screen D is held firmly in place by its inherent resiliency to prevent accidental displacement, while being easily detachable by springing it rearwardly to remove its edges from their seats. The screen D is removed by either prying it out of place with a sharp instrument inserted under its edge or by forcing a blunt instrument through the spout S to push it rearwardly therefrom.

My improved strainer is applied to use as follows: The handle H is grasped in any convenient manner in the left hand with the bowl B tilted at a slight angle to the horizontal as illustrated in Fig. 1. The tea, coffee or other liquid is then poured from its container into the bowl B, whence it will flow down through the screen D and out through the spout S. The guard C prevents the liquid from spattering or spilling over the edge of the strainer and the spout S directs it down into the cup or other receptacle in a confined stream so that there is less danger of its spattering outside the cup. After the cup is filled the strainer may be set down on the table for further use and any residue of liquid remaining in its interior will flow back into the bowl B. The shape of the spout end of the strainer is so designed as to cause the liquid to drain back without any possibility of its overflowing or dripping from the spout. For this reason my improved strainer is absolutely dripless and therefore will not wet or stain the table-cover or other cloth on which it may be set. When seated on its bottom the bowl B is held and steadied by the handle H so as to be proof against upsetting. The relatively long handle on the side of the strainer provides for most convenient handling and manipulation of the device and it is easily set at rest when not in use. For cleansing the strainer the screen D may be easily removed by prying or forcing it out of the bowl as before described and it is as easily replaced by simply springing it back into position. It will be observed that the form and construction of the strainer is such as to present an exceedingly graceful and ornamental appearance and in addition the device is extremely practical and efficient in use. The manner of its use becomes so obvious that no directions are required for its manipulation and furthermore there is no opportunity for misusing it. Through the ingenious method of construction shown the device can be manufactured at a very small cost, while, at the same time, its staunch and rigid structure insures durability in use.

Various modifications might be made in the form and structure of my improved device without departing from the spirit or scope of the invention; therefore, without limiting myself to the exact embodiment shown and described, what I claim is:—

1. In a strainer, the combination with a bowl formed with a spout at one end with a flange extending around its rim and along the sides of the spout, of a convex guard surmounting the top of the bowl and spout with its edge secured to the flanges thereof, a screen arranged within the bowl beneath the guard adjacent the spout, and a handle attached to the side of the bowl.

2. In a strainer, the combination with a bowl formed with a spout and a flange extending around the rim of the bowl and along the sides of the spout, of a cowl-like guard having its edge crimped around the flange on the rim of the bowl and the sides of the spout, a screen arranged within the bowl beneath the guard, and a handle projecting from the side of the bowl.

3. In a strainer, the combination with a bowl formed with a spout with a flange projecting from its rim and the sides of the spout, of a crowned guard surrounding the rim of the bowl and extending above the top of the spout with its edge crimped around the flange on the bowl and the sides of the spout, a screen sprung into place between the top of the guard and the bottom of the bowl with its edges abutting the side-walls thereof, and a handle on the side of the bowl.

4. As a new article of manufacture, a strainer formed with two main portions comprising a bowl-like vessel having a spout at one end, and a cowl-like guard extending around the rim of the bowl and over the top of the spout and secured thereto by fastening the edges of the parts together, said bowl and guard formed with projections on the side fastened together to provide a tube-like ferrule, a handle secured in said ferrule, and a screen held within the bowl beneath the guard and in front of the spout.

5. In a strainer, the combination with a bowl-like vessel formed with a spout at one end and a depression in its bottom, of a guard overhanging a portion of the interior of the vessel and formed with a shouldered recess on its underside, and a section of screen-cloth fitted to the interior of the vessel with its edges sprung into place in the depression in its bottom and the shouldered recess in the guard.

In testimony whereof I affix my signature in presence of two witnesses.

HAROLD E. NOCK.

Witnesses:
MARY L. GAY,
MARY CAVANAGH.

Copies of this patent may be obtained for five cents each, by addressing the "Commissioner of Patents, Washington, D. C."